US006840192B1

(12) United States Patent
Pagano

(10) Patent No.: US 6,840,192 B1
(45) Date of Patent: Jan. 11, 2005

(54) AIR SUPPLY ORGANIZER FOR AQUARIUMS

(76) Inventor: Charles M. Pagano, 3390 Austin Ave., Wantagh, NY (US) 11793

( * ) Notice: Subject to any disclaimer, the term of this patent is extended or adjusted under 35 U.S.C. 154(b) by 29 days.

(21) Appl. No.: 10/347,015

(22) Filed: Jan. 17, 2003

(51) Int. Cl.$^7$ ............................................... A01K 63/00
(52) U.S. Cl. ................................. 119/254; 285/133.11
(58) Field of Search ................................ 119/254, 256, 119/261, 263; 285/5, 133.11; 239/201

(56) References Cited

U.S. PATENT DOCUMENTS

| | | | | |
|---|---|---|---|---|
| 976,242 | A | * 11/1910 | Wohlfahrt | 119/261 |
| 3,149,608 | A | * 9/1964 | Murphy | 119/253 |
| 3,292,579 | A | 12/1966 | Buchanan | |
| 3,316,882 | A | 5/1967 | Renwick | |
| 3,658,035 | A | 4/1972 | Harris | |
| 4,191,129 | A | 3/1980 | Renny | |
| 4,196,695 | A | 4/1980 | Zupo | |
| 5,040,729 | A | * 8/1991 | Carrozza | 239/201 |
| 5,092,991 | A | * 3/1992 | Ogawa | 210/169 |
| 5,367,985 | A | 11/1994 | Wilkins | 119/163 |
| 5,476,068 | A | 12/1995 | Townsend | 119/256 |
| 5,616,288 | A | * 4/1997 | McDonald | 261/76 |
| 5,803,641 | A | * 9/1998 | Nutzel | 403/20 |
| 5,849,185 | A | 12/1998 | Judy, Jr. | 210/169 |
| 6,276,303 | B1 | 8/2001 | Van Kley | 119/263 |
| 6,327,997 | B1 | 12/2001 | Terry et al. | 119/246 |

* cited by examiner

Primary Examiner—Robert P. Swiatek
(74) Attorney, Agent, or Firm—Collard & Roe, P.C.

(57) ABSTRACT

An air supply organizer for an aquarium that provides forced air from an air pump outside of the aquarium to decorative accessories in the aquarium. The air supply organizer comprises a vertical tube that runs from the top of the aquarium, along the side of the aquarium to the bottom of the aquarium. There it is coupled to a horizontal tube that runs along the bottom of the aquarium. The vertical tube and horizontal tube are frictionally coupled by an L-shaped joint piece. Flexible plastic tubing runs from the air pump through the vertical tube and the horizontal tube, providing forced air to decorative aquarium accessories. The horizontal tube and L-shaped joint piece are able to be concealed under sand or gravel on the base of the aquarium permitting the flexible plastic tubing to reach the decorative accessories without being visible.

16 Claims, 3 Drawing Sheets

AIR SUPPLY ORGANIZER FOR AQUARIUMS

BACKGROUND

Aquarium displays have become increasingly popular and efforts to enhance the visual appeal of aquariums have resulted in numerous decorative accessories. Many decorative accessories are attached to pumps that force air through the accessory. This allows the accessory to produce bubbles from the bottom of the tank. In order for the forced air to reach the accessory, it must be connected to the pump by tubing that runs over and down the wall of the aquarium then along its floor. When there are several accessories connected to the pump, the tubings detract from the appearance of the aquarium. It is desirable for aquarium tanks to have an appearance free of many conduits and lines extending along the floor of the aquarium and up and over the upper rim of the tank.

U.S. Pat. No. 5,367,985 to Wilkins discloses an aquarium module for making the feed lines of aquarium accessories invisible. The invention comprises a module that sits on the aquarium floor and distributes air throughout the floor. Short tubes can be connected at the desired spaces for connecting decorative accessories and one tube leads out the aquarium for connection to the air supply.

U.S. Pat. No. 5,476,068 to Townsend discloses an aquarium display that comprises a tube connected to a pump disposed underneath the gravel of the tank. The tube connects to a granular media bed so that water flowing through tube mixes with the granular media bed and shoots a water/granular mixture from the tube.

U.S. Pat. No. 3,292,579 to Buchanan discloses and aquarium power supply in which the aquarium has a false bottom for containing tubing and filter devices. Tubes lead up into the gravel for the air and electricity.

These patents do not provide an adaptable system that can hide air supply tubes. They also do not provide the versatility of allowing the decorative accessories to be placed in an infinite amount of positions with minimal intrusion into the tank. The present invention solves these problems by providing an adaptable system comprising several nieces that may be linked together to form different air supply paths. Since the system is adaptable, it minimizes the number of pieces necessary to provide the air, thereby also minimizing the space occupied by the air supply system within the tank.

SUMMARY

The invention relates to an organizer for an aquarium that hides air supply tubes connecting decorative accessories within the tank to a source of pressurized air. Normally, these tubes are visible and unsightly. The invention involves a series larger of tubes with L- and T-joints that are arranged underneath the gravel of the fish tank. The air supply tubes are snaked through this system and connected to the decorative accessories.

The system has a single vertical tube along a corner of the tank through which all of the air tubes are fed. The vertical tube runs from the top of the aquarium, near the water surface, along the side of the aquarium to the bottom of the aquarium.

A horizontal tube is coupled to the vertical tube at the bottom of the aquarium. This horizontal tube runs along the bottom of the aquarium. The horizontal tube is frictionally coupled to the vertical tube by an L-shaped joint piece. The horizontal tube and the vertical tube are both inserted into the L-shaped joint piece. Along the floor of the aquarium the first horizontal tube may be connected to additional horizontal tubes via L- and T-shaped joint pieces. This proves a series of outlets that are adaptable in position throughout the tank. The vertical and horizontal tubes may be cut to a desired length depending on the size of the aquarium.

Flexible plastic tubing runs from the air pump through the vertical tube and the horizontal tube. At the end of each horizontal tube the plastic tubing provides forced air to decorative aquarium accessories, positioned on the floor of the aquarium.

The horizontal tube and L- and T-shaped joint pieces are completely concealed under sand or gravel on the base of the aquarium permitting the flexible plastic tubing to reach the decorative accessories without being visible. All that is viewed from outside the aquarium is the single vertical tube which provides a cleaner more attractive look than several plastic tubings running to individual accessories.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
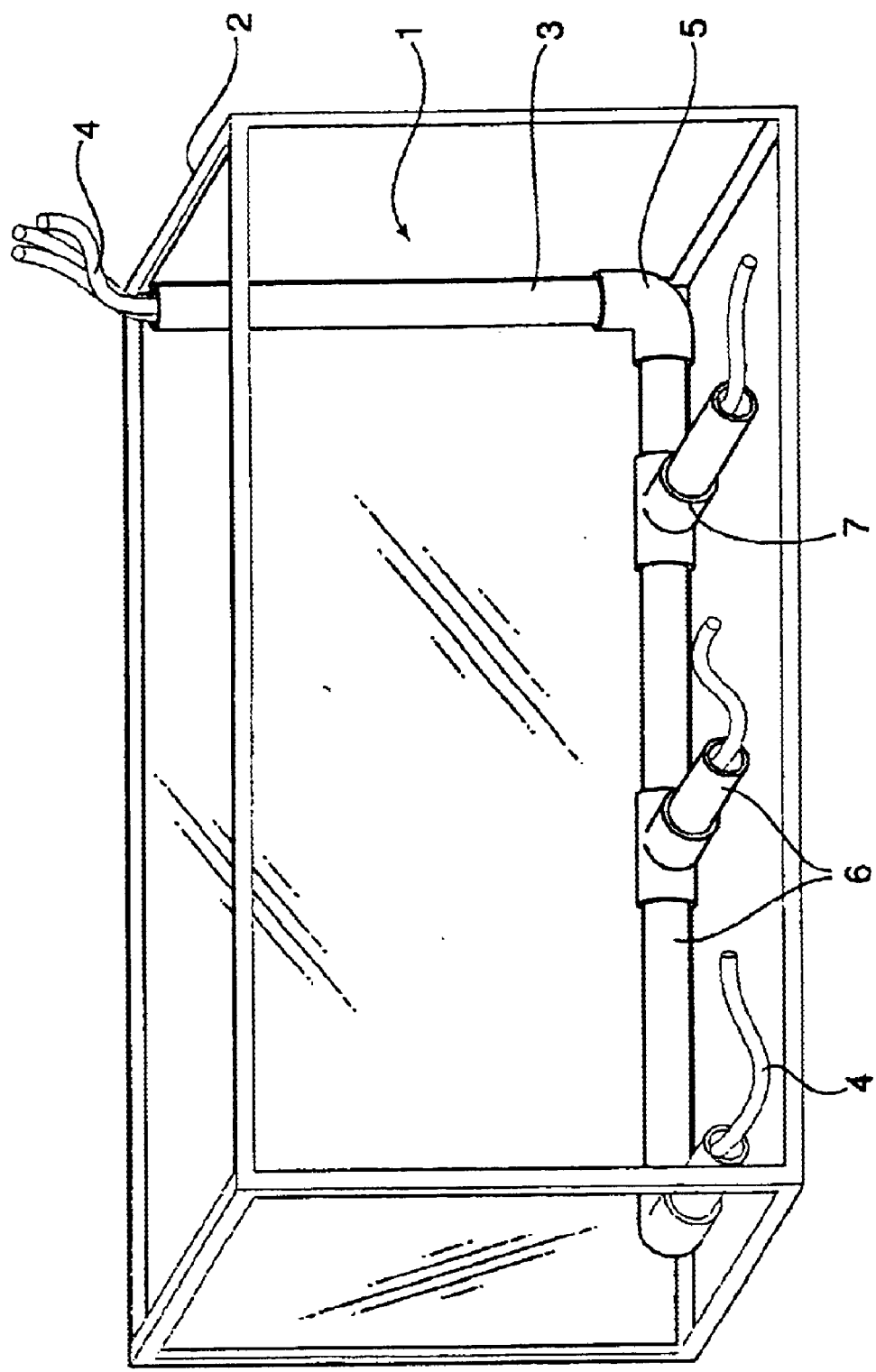
FIG. 1 shows a perspective view of an empty aquarium having an air supply organizer.

Referring in detail to the drawings, FIG. 1 shows a perspective view of an empty aquarium 2 having an air supply organizer 1 disposed within aquarium 2. Air supply organizer 1 has a vertical tube 3 running vertically along a side of aquarium 2. Preferably, vertical tube 3 is placed in a corner of aquarium 2. Flexible plastic tubing 4 is fed from outside the tank through vertical tube 3. Flexible plastic tubing 4 is connected to an air pump 10 outside aquarium 2.

Vertical tube 3 is coupled to a horizontal tube 6 via an L-shaped joint piece 5. Vertical tube 3 and horizontal tube 6 are both inserted into L-shaped joint piece 5 and frictionally held in place. Horizontal tube 6 runs along the floor of aquarium 2.

Flexible plastic tubing 4 runs through L-shaped joint piece 5 and horizontal tube 6. The shape and path or air supply system 1 may vary. Vertical tube 3 and horizontal tube 6 are cut to specific lengths depending on the size and shape of aquarium 2 as well as the desired placement of a decorative accessory 3 that will be connected to flexible plastic tubing 4. Air supply system 1 can be assembled so that there are a multitude of air outlets for several decorative accessories 8.

Figure 2:
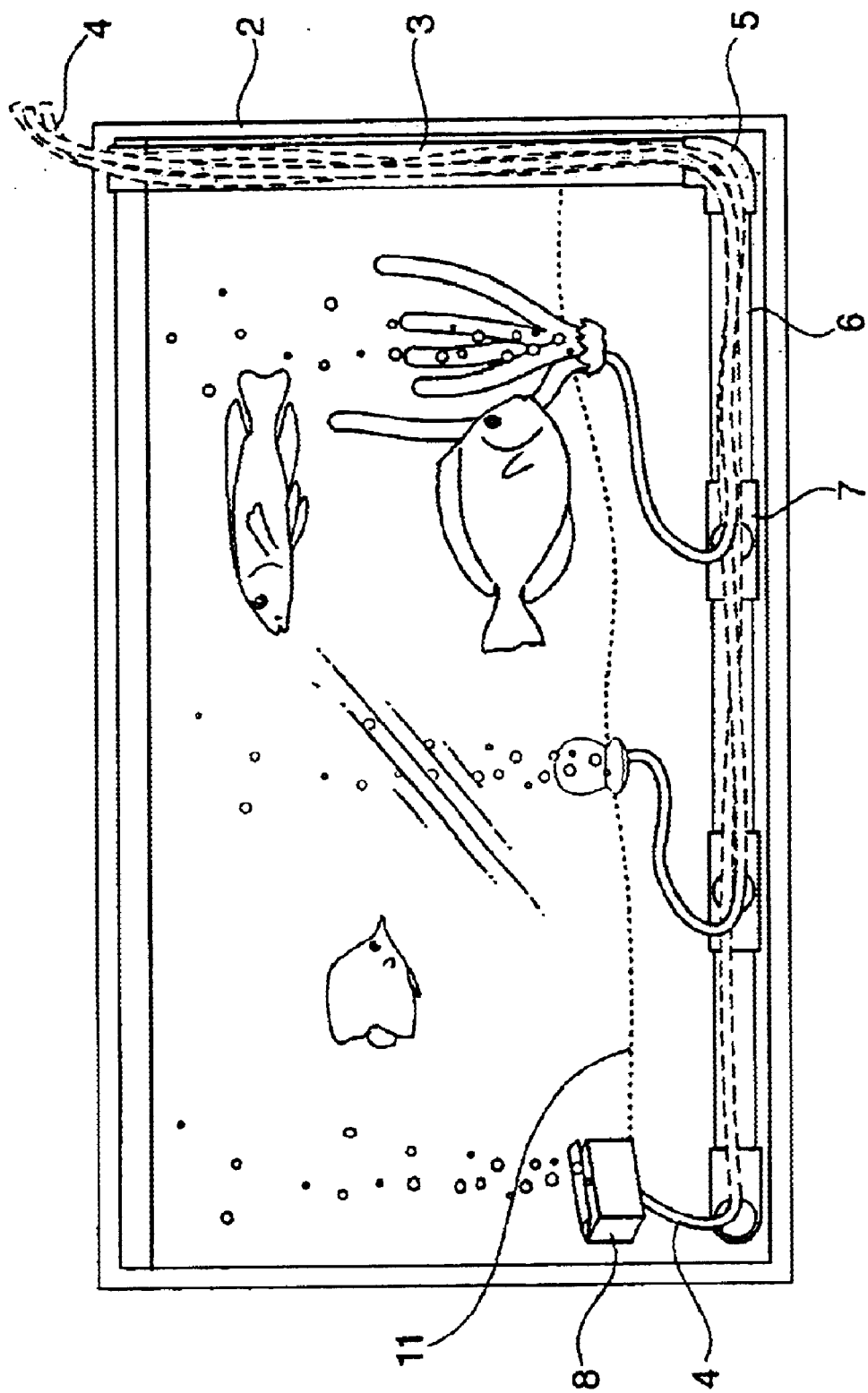
FIG. 2 shows a front view of a full aquarium having an air supply organizer.
Figure 3:
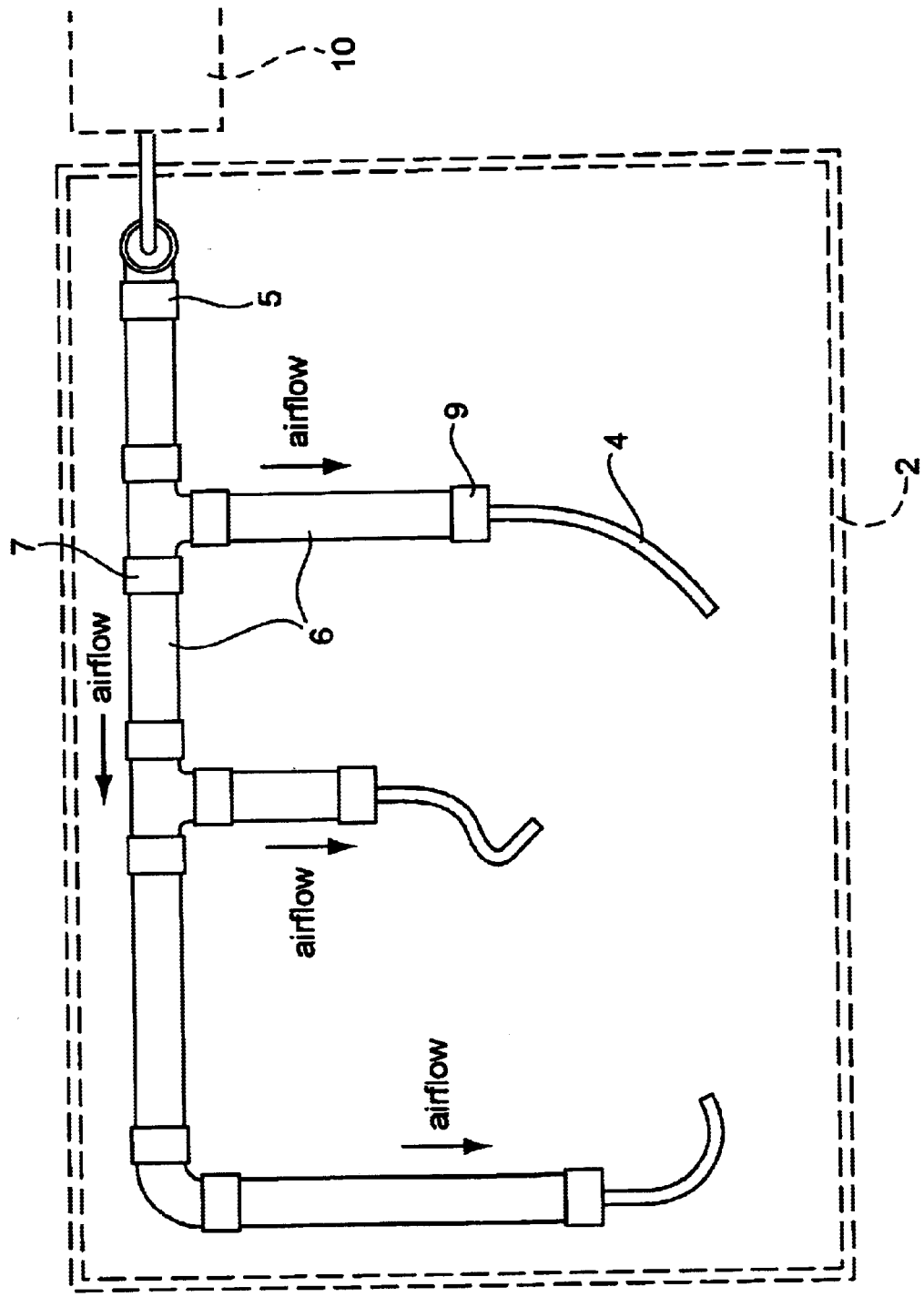
FIG. 3 shows a top view of an empty aquarium having an air supply organizer.

Horizontal tube 6 can be joined to a T-Shaped joint piece 7, which provides two separate outlets for flexible plastic tubing 4. Additional horizontal tubes 6 are joined to these outlets and if more than one flexible plastic tubing 4 is supplied, they can travel to different outlets. FIGS. 1–3 show air supply system 1 having two T-shaped joint pieces 7, and an additional L-shaped joint piece 5, providing three separate outlets for flexible plastic tubing 4.

FIG. 2 shows a front view of air supply system 1 in a full aquarium 2. Horizontal tubes 6, L-shaped joint pieces 5, T-shaped joint pieces 7 as well as part of vertical tube 3 are covered by sand or gravel 11 on the floor of aquarium 2. Flexible plastic tubing 4 emerges from air supply system 1 at a desired location and travels up through sand or gravel 11 to a specific decorative accessory 8. Decorative accessory 8 then provides air in aquarium 2 without having visible flexible elastic tubing 4.

FIG. 3 shows a top view of air supply system 1 in an empty aquarium. Caps 9 are disposed at the ends of horizontal tubes 6 where flexible plastic tubing 4 emerges from air supply system 1. Caps 9 have a hole through which flexible plastic tubing 4 passes. The diameter of this hole is preferably only as wide as flexible plastic tubing 4. Caps 9 are held over horizontal tubes. They may be held in place by friction alone or by a threaded means on the inside of cap 9.

Accordingly, while one embodiment of the present invention has been shown and described, it is to be understood that many changes and modifications may be made thereunto without departing from the spirit and scope of the invention as defined in the appended claims.

What is claimed is:

1. A tubular organizer comprising:
   a vertical tube having a top end and a bottom end;
   at least one horizontal tube coupled to said bottom end of said vertical tube, wherein said at least one horizontal tube has two ends;
   at least one hollow joint piece frictionally coupling said vertical tube to said at least one horizontal tube; wherein the tubular organizer is open from end to end, wherein said tubular organizer is incorporated into an existing aquarium so that said vertical tube runs along a side of the aquarium and said at least one horizontal tube runs along the floor of the aquarium, said at least one horizontal tube including flexible plastic tubing connecting decorative accessories with an air pump; and
   at least one cap disposed at a free end of said at least one horizontal tube that is not coupled to the tubular organizer, wherein said at least one cap has a hole that permits the flexible plastic tubing to pass through said at least one cap to reach the decorative accessory.

2. The tubular organizer of claim 1, further comprising at least one hollow T-shaped joint piece that couples said at least one horizontal tube to additional horizontal tubes.

3. The tubular organizer of claim 2, wherein said horizontal tubes are inserted into said at least one hollow T-shaped joint piece.

4. The tubular organizer of claim 1 wherein two horizontal tubes are connected by said at least one hollow joint piece, and wherein said at least one hollow joint piece is L-shaped.

5. The tubular organizer of claim 1, wherein said vertical tube and said at least one horizontal tube are inserted into said at least one hollow L-shaped joint piece.

6. The tubular organizer of claim 1, wherein said at least one horizontal tube and said at least one hollow joint piece are at least partially concealed under sand or gravel on the base of the aquarium permitting flexible plastic tubing to reach the decorative accessories without being visible.

7. The tubular organizer of claim 1, wherein said at least one cap fits over said at least one horizontal tube and is frictionally held in place.

8. The tubular organizer of claim 1, wherein said at least one cap fits over said at least one horizontal tube and is held in place by a threaded means inside said at least one cap.

9. An aquarium with an air supply organizer comprising:
   a glass tank used as an aquarium having a top, bottom and four sides, and having sand or gravel at said bottom;
   at least one decorative necessary at said bottom of said glass tank;
   an air pump outside of said glass tank that provides forced air to said at least one decorative accessory;
   a vertical tube that runs from said top of said glass tank, above a target water level, along one of said sides of said glass tank to said bottom of said glass tank;
   at least one horizontal tube coupled to said vertical tube and running along said bottom of said glass tank, wherein said at least one horizontal tube has two ends;
   at least one hollow L-shaped joint piece frictionally coupling said vertical tube to said at least one horizontal tube; and
   flexible plastic tubing running from said air pump through said vertical tube, said at least one hollow L-shaped joint piece and said at least one horizontal tube to said at least one decorative accessory;
   wherein said at least one horizontal tube and said L-shaped joint piece are at least partially concealed under said sand or gravel on said bottom of said glass tank permitting said flexible plastic tubing to reach said at least one decorative accessory without being visible.

10. The aquarium and air supply organizer of claim 9, further comprising at least one hollow T-shaped joint piece that couples said at least one horizontal tube to additional horizontal tubes.

11. The aquarium and air supply organizer of claim 10, wherein said horizontal tubes are inserted into said at least one hollow T-shaped joint piece.

12. The aquarium and air supply organizer of claim 9, wherein two horizontal tubes are connected by said at least one hollow L-shaped joint piece.

13. The aquarium and air supply organizer of claim 9, wherein said vertical tube and said at least one horizontal tube are inserted into said at least one hollow L-shaped joint piece.

14. The aquarium and air supply organizer of claim 9, further comprising at least one cap disposed at a free end of said at least one horizontal tube that is not coupled said at least one joint piece, wherein said at least one cap has a hole that permits said flexible plastic tubing to pass through said at least one cap to reach at least one decorative accessory.

15. The aquarium and air supply organizer of claim 14, wherein said at least one cap fits over said at least one horizontal tube and is frictionally held in place.

16. The aquarium and air supply organizer of claim 14, wherein said at least one cap fits over said at least one horizontal tube and is held in place by a threaded means inside said at least one cap.

* * * * *